(12) United States Patent
Chen

(10) Patent No.: US 6,202,667 B1
(45) Date of Patent: Mar. 20, 2001

(54) APPARATUS AND METHOD FOR STOPPING THE PROPAGATION OF IGNITED FLAMMABLE GAS IN A CONDUIT

(75) Inventor: W. T. Chen, Hsin-Chu (TW)

(73) Assignee: Taiwan Semiconductor Manufacturing Company, LTD, Hsin Chu (TW)

( * ) Notice: Subject to any disclaimer, the term of this patent is extended or adjusted under 35 U.S.C. 154(b) by 0 days.

(21) Appl. No.: 09/457,557

(22) Filed: Dec. 9, 1999

(51) Int. Cl.⁷ ..................................... F16K 17/00
(52) U.S. Cl. .......................... 137/68.13; 137/75; 137/457
(58) Field of Search ................... 137/68.13, 75, 137/240, 457

(56) References Cited

U.S. PATENT DOCUMENTS

| | | | |
|---|---|---|---|
| 3,332,432 | * | 7/1967 | Marsh ............................. 137/68.13 |
| 3,739,796 | * | 6/1973 | Jablansky ........................ 137/68.13 |
| 4,248,309 | * | 2/1981 | Hofle et al. ..................... 169/47 |

* cited by examiner

Primary Examiner—Gregory L. Huson
Assistant Examiner—Ramesh Krishnamurthy
(74) Attorney, Agent, or Firm—Tung & Associates

(57) ABSTRACT

An apparatus and a method for stopping the propagation of an ignited flammable gas in a conduit used in semiconductor processing are proposed and described. In the apparatus, a mounting mechanism and a bullet are provided inside an elongated conduit body wherein the bullet is detachably mounted to the mounting means, while the mounting mechanism is fixedly attached to an inside wall of the elongated conduit body. The bullet is equipped with an explosive pack in a body portion and a bullet head in a head portion. When a flame from an ignited flammable gas enters the conduit and ignites the explosive pack, the bullet is propelled into and frictionally engaging the inlet end of the conduit body such that an internal passageway in the inlet end is substantially blocked to prevent the further propagation of flame upstream into the conduit. The bullet utilized in the present invention novel apparatus may be suitably supplied with a tapered body such that the tapered surface advantageously engages the internal passageway in the inlet end of the conduit body when the bullet is by the explosion of an explosive pack toward the inlet end.

20 Claims, 3 Drawing Sheets

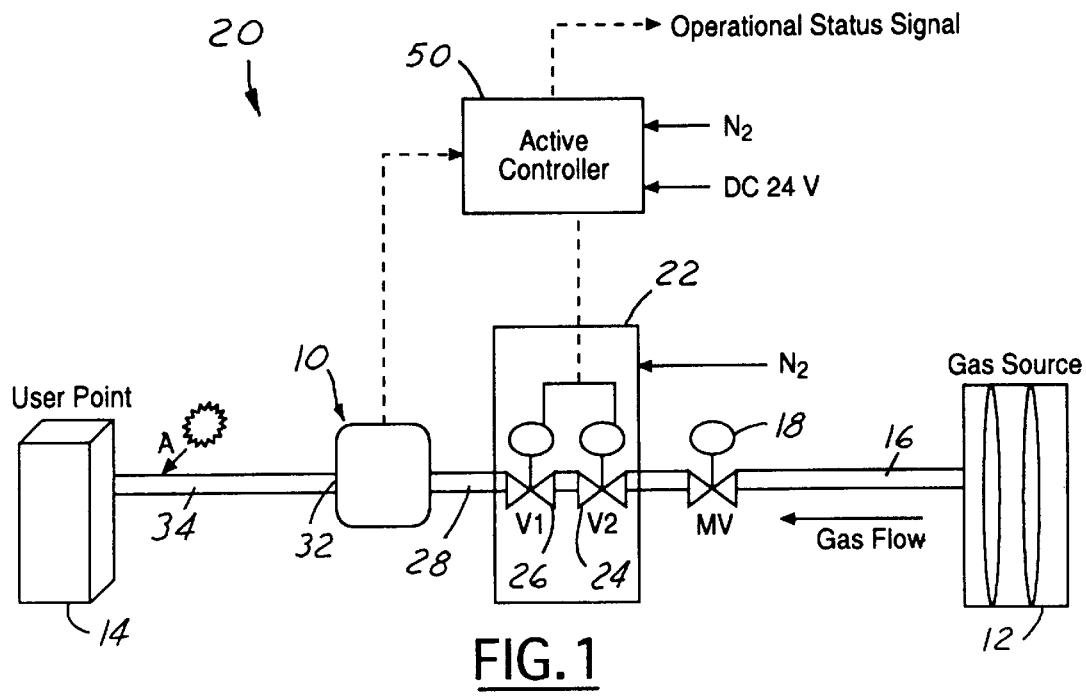
FIG.1
| | | V1 | V2 | Action |
|---|---|---|---|---|
| Instruction | Normal Close | 11 | 11 | Deliver Gas |
| | OFF | 10 | 10 | Stop All Gas |
| | Normal Open | 00 | 00 | Deliver $N_2$ |
FIG.2
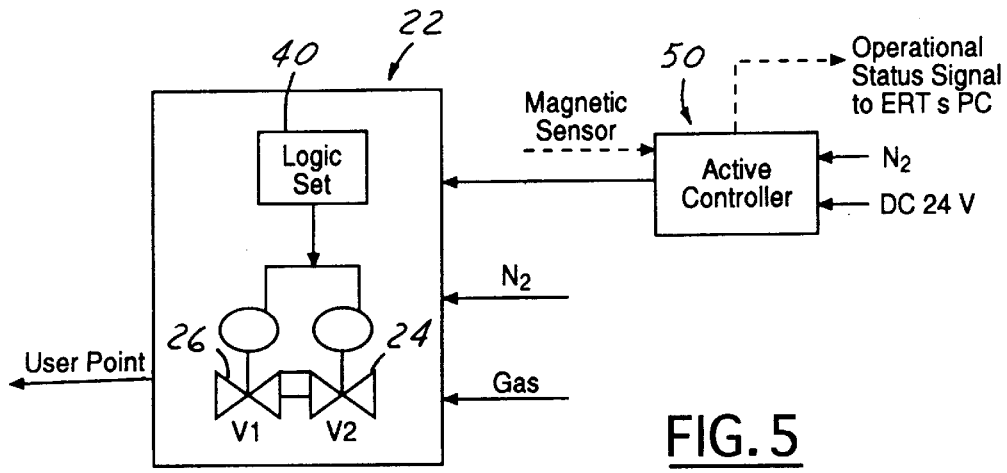
FIG.5

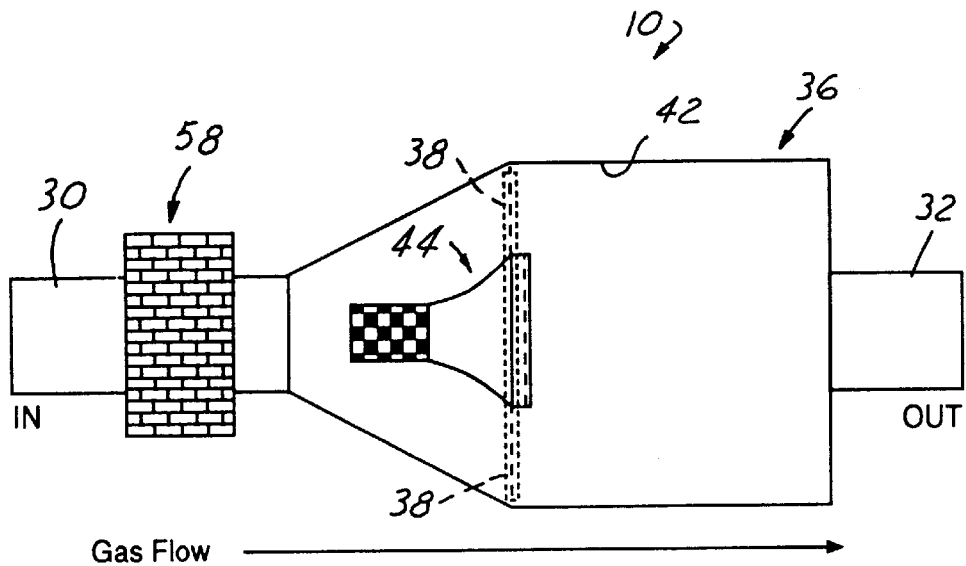
FIG. 3A
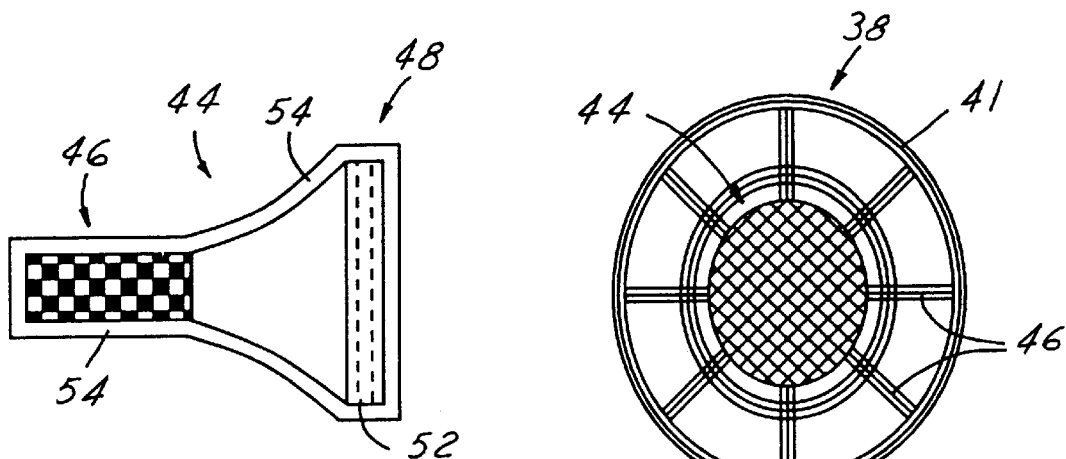
FIG. 3B
FIG. 3C

APPARATUS AND METHOD FOR STOPPING THE PROPAGATION OF IGNITED FLAMMABLE GAS IN A CONDUIT

FIELD OF THE INVENTION

The present invention generally relates to an apparatus and a method for stopping the propagation of an ignited flammable gas in a conduit and more particularly, relates to an apparatus and a method for stopping the propagation of an ignited flammable gas in a conduit by mounting a bullet means inside the cavity of a conduit equipped with an explosive pack and a bullet head such that when the explosive pack is ignited by a flame of the ignited flammable gas, the internal passage in the conduit is blocked by the bullet head when the head is propelled into and frictionally engages the passageway thus stopping the propagation of the flame in the conduit.

BACKGROUND OF THE INVENTION

In the fabrication of semiconductor devices, a semi-conducting wafer must be processed in a large number of processing steps for producing various integrated circuits on chips. These processing steps may amount to as many as several hundred. The various processing steps are conducted in a large variety of processing, machines for carrying out chemical or physical reactions on the semi-conducting wafer. In the various fabrication steps, a large number of reactant gases are used. The reactant gases and their reaction products frequently encountered in the semiconductor fabrication industry may be highly flammable. For instance, the highly flammable gases may include silane, hydrogen and various other hydrocarbon gases. An effluent gas from the process machine must therefore be treated either in a chemical process or in a physical absorption or condensation process before it is released into a factory exhaust system and subsequently into the atmosphere.

The high flammability gases, which are normally of high boiling temperature or high boiling temperature components of other gases, present a serious processing hazard in the semiconductor fabrication facility. When such flammable gases are inadvertently, or accidentally ignited either in the chamber of a process machine or in a conduit connecting between the chamber and a flammable gas supply source, extremely serious consequences can result from such mishaps. Major fires have occurred in recent years in semiconductor fabrication facilities which result in serious personal injuries and equipment losses leading to a complete shut-down of the fabrication facility. The inadvertent or accidental ignition of a highly flammable gas can be caused by static electric charges, sparks produced by moving mechanical components or the self-igniting of flammable gases when exposed to high temperatures or oxygen environment.

The flammable gases that pose serious fire hazard may include those which are used as reactant gases and those which are by-products of a chemical reaction occurring in a reaction chamber. Since the exhaust conduits for the individual process machines are normally connected to a single factory exhaust, i.e., all the exhaust conduits from the various process machines are interconnected together in a fabrication facility, the spread of fire or explosion in the conduits can be extremely rapid and wide spread. For instance, a single fire started in a process machine can spread almost instantly to a large number of process machines and gas conveying conduits. The extent of damage to a semiconductor fabrication plant caused by a single fire started in a conduit or in a process machine can be astronomical as measured by the loss of human lives, bodily injuries and property damages.

After the occurrence of a fire in a fabrication facility, the recovery or clean-up procedure can be extremely laborious and time consuming. This is because the large amount of contaminating particles and debris generated during the fire which contaminates all the gas conveying conduits and the process chambers. It is not unusual that, after a major fire has erupted in a semiconductor fabrication facility, at least several months of production time is lost due to the clean-up and the refurbishing of damaged equipment.

It is therefore an object of the present invention to provide an apparatus and a method for stopping the propagation of an ignited flammable gas in a conduit that can be instantly effective upon the entering of a flame into the conduit without time delay that would otherwise be required in shutting off gas supply valves.

It is another object of the present invention to provide an apparatus for stopping the propagation of an ignited flammable gas in a conduit by utilizing a bullet means suspended in the conduit.

It is a further object of the present invention to provide an apparatus for stopping the propagation of an ignited flammable gas in a conduit by utilizing a bullet means which is deployable instantaneously when a flame enters a cavity of the conduit.

It is another further object of the present invention to provide an apparatus for stopping the propagation of an ignited flammable gas in a conduit by providing a mounting means fixedly attached inside a cavity of the conduit and mounting a bullet means thereon.

It is still another object of the present invention to provide an apparatus for stopping the propagation of an ignited flammable gas in a conduit by providing a bullet means which has an outside diameter larger than the diameter of the internal passage in the conduit.

It is yet another object of the present invention to provide an apparatus for stopping the propagation of an ignited flammable gas in a conduit by providing a bullet means which has a tapered, outside profile such that when the bullet means is deployed upon ignition by a flame, the tapered contour blocks a passage in an inlet end of the conduit and thus stopping the propagation of the flame from traveling further upstream.

It is still another further object of the present invention to provide a method for stopping the propagation of an ignited flammable gas in a conduit by providing a conduit body equipped with a mounting means and a bullet means inside the conduit cavity which can be activated upon the detection of a flame.

It is yet another further object of the present invention to provide a method for stopping the propagation of an ignited flammable gas in a conduit by providing a bullet means suspended in the cavity of the conduit equipped with an explosive pack such that a head portion of the bullet means is propelled toward an inlet of the conduit upon ignition by a flame to frictionally engaging the passageway in the inlet and stop the propagation of the flame from traveling further upstream.

SUMMARY OF THE INVENTION

In accordance with the present invention, an apparatus and a method for stopping the propagation of an ignited flammable gas in a conduit are provided.

In a preferred embodiment, an apparatus for stopping the propagation of an ignited flammable gas in a conduit can be provided which includes an elongated conduit body that has an inlet end and an outlet end, a mounting means fixedly attached to an inside wall of the elongated conduit body between the outlet end and the inlet end, and a bullet means including a head portion and a body portion, the body portion is detachably mounted to the mounting means such that the body portion is suspended in a cavity of the elongated conduit body with the head portion pointed toward the inlet end, the body portion is equipped with an explosive pack which has an ignition means exposed to and facing the outlet end of the conduit body, the body portion further includes an outside diameter larger than an inside diameter of the inlet end of the conduit body such that when the explosive pack is ignited by a flame entering the cavity of the conduit body from the outlet end, the bullet means severs from the mounting means and propels toward the inlet end such that the outside perimeter of the body portion of the bullet means frictionally engages the inside diameter of the inlet end of the conduit body substantially blocking a passage in the inlet end and stopping propagation of the flame.

The apparatus for stopping the propagation of an ignited flammable gas in a conduit may further include a sensor means mounted outside the inlet end of the elongated conduit body for sensing a deployment of the bullet means and for sending a signal to a control panel. The sensor means may be a magnetic sensing means for detecting the presence of the bullet means inside the inlet end of the conduit body when the bullet means is fabricated of metal. The bullet means may be coated with a layer of anti-corrosion material on its outside surface. The bullet means may be coated with a material including Teflon.

In the apparatus for stopping the propagation of an ignited flammable gas in a conduit, the body portion of the bullet means may have a tapered shape with a smaller end of the taper juxtaposed to the head portion of the bullet means, the smaller end of the taper may have an outside diameter smaller than the inside diameter of the inlet end, a larger end of the taper may have an outside diameter larger than the inside diameter of the inlet end. The head portion of the bullet means may be provided in a metal that has magnetic characteristics. The apparatus may further include conduit means for feeding an inert gas into a conduit that has flame produced therein for purging a flammable gas out of the conduit. The flame entering the cavity of the conduit body may be produced by an ignited flammable gas. The apparatus may be in fluid communication with a flammable gas supply source at the inlet end and with a chamber of a process machine at an outlet end.

The present invention is further directed to a method for stopping the propagation of ignited flammable gas in a conduit that can be carried out by the operating steps of providing an elongated conduit body that has an inlet end and an outlet end, the conduit body may have a mounting means fixedly attached to an inside wall of the elongated conduit body between the inlet end and the outlet end, and a bullet means including a head portion and a body portion, detachably mounting the body portion of the bullet means to the mounting means with the head portion facing the inlet end of the conduit body, the body portion of the bullet means may be equipped with an explosive pack which has an ignition means exposed to and facing the outlet end of the conduit body, and igniting the explosive pack by a flame from an ignited flammable gas that enters into the outlet end of the conduit body and causing the head portion of the bullet means to be propelled toward the inlet end of the conduit body resulting in a frictional engagement between an outside surface of the body portion of the bullet means and an inside surface of the inlet end of the conduit body to substantially block a passageway in the inlet end.

The method for stopping the propagation of an ignited flammable gas in a conduit may further include the step of mounting a sensor means outside the inlet end of the conduit body for sensing the presence of the head portion of the bullet means when the bullet means has been deployed.

The method may further include the step of sending an alarm signal to a control panel when the presence of the head portion of the bullet means is sensed by the sensor means, or the step of mounting a magnetic sensor means outside the inlet end of the conduit body. The method may further include the step of coating an outside surface of the bullet means with a corrosion-proof cover layer, or the step of coating an outside surface of the bullet means with a low frictional coefficient, corrosion-proof cover layer, or the step of coating an outside surface of the bullet means with Teflon.

The method for stopping the propagation of an ignited flammable gas in a conduit may further include the step of providing the body portion of the bullet means with a tapered shape wherein a smaller end of the taper is connected to the head portion and frictional engaging a larger end of the taper with an inside surface of the inlet end of the conduit body. The method may further include the step of fabricating the head portion of the bullet means in a magnetic metal. The method may further include the step of feeding an inert gas into the conduit body after the bullet means is deployed.

BRIEF DESCRIPTION OF THE DRAWINGS

These and other objects, features and advantages of the present invention will become apparent from the following detailed description and the appended drawings in which:

FIG. 1 is a graph illustrating the connection method of the present invention apparatus between a flammable gas supply source and a process machine.

FIG. 2 is a logic table illustrating the operation of two control valves for controlling a flow of flammable gas into the present invention detection apparatus.

FIG. 3A is an enlarged, cross-sectional view of the present invention apparatus of an elongated conduit body that is equipped with a mounting means, a bullet means and a magnetic sensing means.

FIG. 3B is an enlarged, cross-sectional view of the present invention bullet means used for blocking the internal passage of an elongated conduit body.

FIG. 3C is an end view of the bullet means and the mounting means illustrating the mounting of the bullet means.

FIG. 5 is a graph illustrating the present invention logic control means for the shutoff valves for shutting off the flammable gas supply line after a bullet means is deployed and sensed by a magnetic sensing means.

DETAILED DESCRIPTION OF THE PREFERRED EMBODIMENT

Figure 4A:
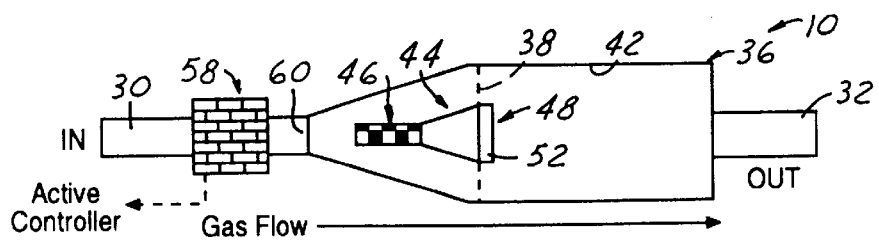
FIG. 4A is a cross-sectional view of the present invention apparatus of a mounting means and a bullet means inside an elongated conduit body before the deployment of the bullet means.

Referring initially to FIG. 1, wherein a present invention novel apparatus 10 is shown in a system 20 connecting a flammable gas supply source 12 and a process machine 14. The flammable gas supply source 12 may consist of a plurality of gas storage cylinders that are parallely connected to supply a flammable gas through conduit 16 and manual valve 18 into a gas manifold box 22. Inside the gas manifold box 22 is equipped a logic circuit control valves 24 and 26 as a dual-stage control system. The flammable gas then enters the flame-stopping apparatus 10 through conduit 28. A detailed drawing illustrating the construction of the apparatus 10 is shown in FIGS. 3A–3C. The flammable gas flows through the apparatus 10, through a gas outlet 32 and conduit 34 into the process machine 14. The present invention is further equipped with a gas manifold box 22 (shown in FIG. 5) which is controlled by an active controller 50 for shutting off the flammable gas supply conduit when an ignited flammable gas is detected and stopped in conduit 34, i.e., when the ignited flammable gas propagates from conduit 34, through gas outlet 32 into the flame-stopping apparatus 10.

The logic operation of the valve manifold box 22, containing the shut off valves 24, 26 is shown in FIG. 5. It is seen that when the two valves 24, 26 are in normal close position, a flammable gas is delivered through conduit 28 into the apparatus 10. When both the shut off valves 24, 26 are in an off position, all gas flow through the valve manifold box 22 is stopped. When the valves 24, 26 are in normal open position, an inert purge gas of nitrogen is delivered through the valve manifold box 22 into the apparatus 10.

FIG. 3A is a cross-sectional view of the present invention novel apparatus 10 for stopping the propagation of an ignited flammable gas in a conduit. The apparatus 10 is constructed of an elongated conduit body 36 that has an inlet end 30 and an outlet end 32. The elongated conduit body 36 is further equipped with a mounting means 38 which is fixedly attached to an inside wall 42 of the conduit body 36 between the inlet end 30 and the outlet end 32. The mounting means 38 may further include an outside circular member 41. an inside circular member 56 and a plurality of spokes 46 connected thereinbetween. The mounting means 38 can be constructed in any corosion-proof material such as stainless steel, or Teflon coated aluminum or steel.

The elongated conduit body 36 is further equipped with a bullet means 44, which is shown in detail in FIGS. 3B and 3C. The bullet means 44 is constructed by a head portion 46 and a body portion 48 integrally connected together. The body potion 48 may be formed in a tapered shape, such as that shown in FIG. 3B wherein the small end of the taper is integrally connected to the head portion 46 and the large end of the taper, i.e., the body portion 48 is provided with an explosive pack 52. The explosive pack 52 is further equipped with an ignition means (not shown) which is exposed to and facing the outlet end 32 of the conduit body 36 when the bullet means 44 is mounted on the mounting means 38, as shown in FIG. 3A. The explosive pack 52 may be suitably provided in an explosive material such as TNT, which typically ignites at 68° C. The shell 54 which connects the body portion 48 and the head portion 46 may be suitably provided in a corrosion-proof material, such as stainless steel, or a stainless steel coated with a Teflon layer. The function of the Teflon coating layer is to provide corrosion-proof property for the bullet means 44 and furthermore, to provide a lubricity property for the bullet means 44 such that, when deployed as shown in FIG. 4B, the shell 44 of the bullet means 44 easily engages the internal passageway of the inlet end 30 in the conduit body 36.

The head portion 46 of the bullet means 44 can be suitably fabricated in a metallic material, and more suitably by a metallic material that has magnetic properties such that it can be detected by a magnetic sensor.

Figure 4B:
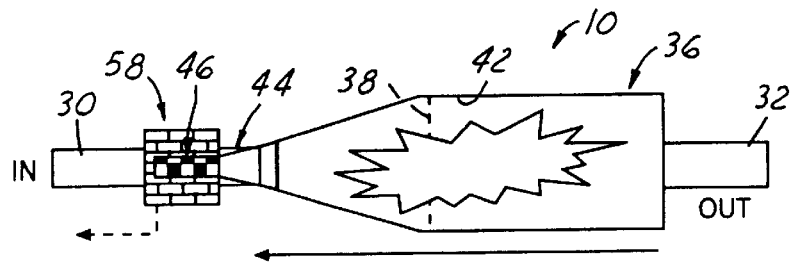
FIG. 4B is a cross-sectional view of the present invention apparatus of FIG. 4A after the bullet means is deployed.

FIGS. 4A and 4B illustrate the functioning of the present invention novel apparatus, and particularly the functioning of the bullet means 44. FIG. 4A illustrates a normal operating condition of the elongated conduit body prior to the detection of any ignited flammable gases. As shown in FIG. 4A, a magnetic sensor means 58 is further utilized by mounting the sensor means 58 around the inlet 30. After the deployment of the bullet means 44, as shown in FIG. 4B, the explosive pack generates a propelling force such that the bullet means 44 is propelled into the inlet 30. Due to the larger outside diameter of the body portion of the bullet means 44 than the inside diameter of the inlet 30, the bullet means 44 frictionally engages the inside wall of the inlet 30 to substantially block the internal passageway 60 of the inlet 30. Consequently, the head portion 46 protrudes into the inlet 30, i.e., into the detection area of the magnetic sensor means 58. After the head portion 46 is sensed by the magnetic sensor means 58, a signal is sent to an active controller 50.

As shown in FIG. 5 of a logic set 40, when a bullet means 44 has been deployed, the magnetic sensor 58 senses the bullet means 44 and sends out a signal to the active controller 50 which in turn sends an operation status signal to the central process controller, i.e. an Emergency Response or Team ERT, of the process machine and, simultaneously pumps an inert gas such as nitrogen into the conduit body 36 to purge out the ignited flammable gas.

Figure 6:
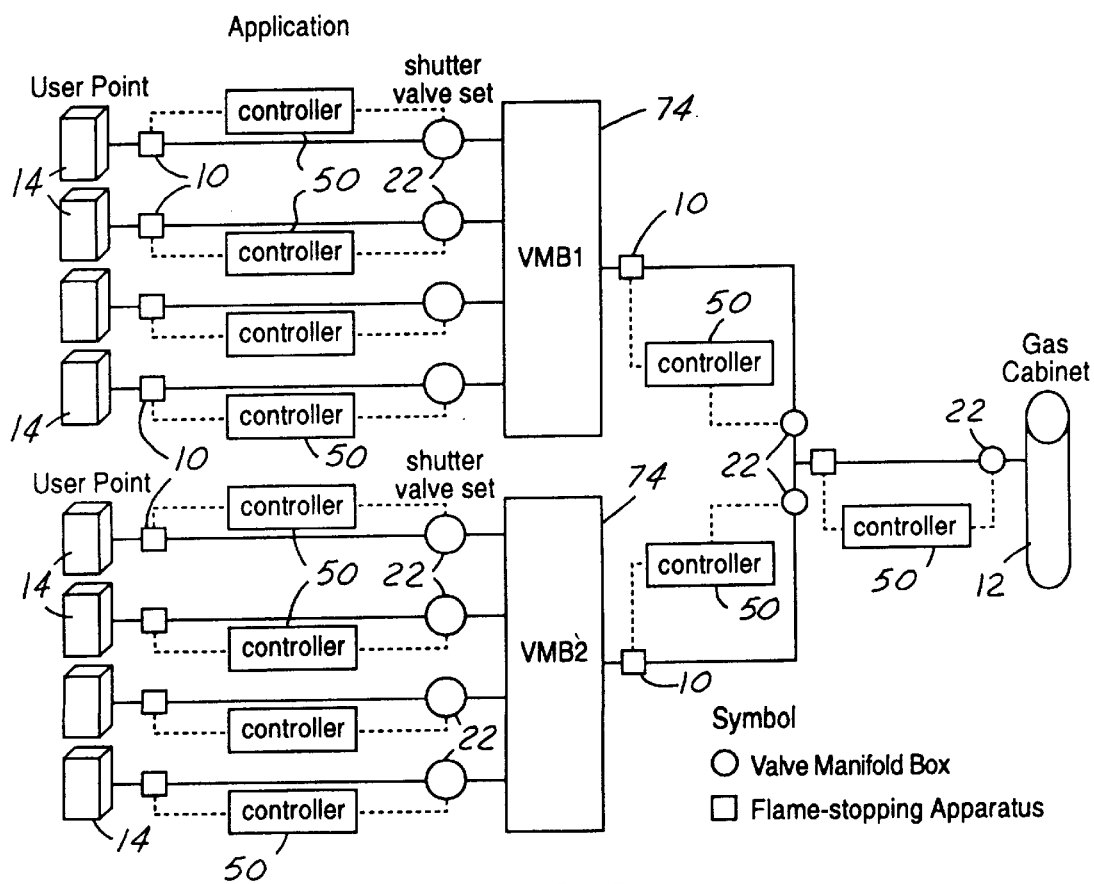
FIG. 6 is a flow chart for using the present invention detection apparatus when a single gas supply source is used to feed a multiple number of process machines.

The present invention novel detection apparatus 10 can further be used in a multiple process machine system, as shown in FIG. 6, wherein a multiple number of valve manifold box 22 are utilized to control a multiple number of process machines 14 through a flame-stopping apparatus 10 mounted on each process machine in fluid communication with the process machine cavity.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. An apparatus for stopping the propagation of an ignited flammable gas in a conduit comprising:

an elongated conduit body having an inlet end and an outlet end, a mounting means fixedly attached to an inside wall of said elongated conduit body between said inlet end and said outlet end, and a bullet means comprising a head portion and a body portion, said body portion being detachably mounted to said mounting means such that the body portion is suspended in a cavity of said elongated conduit body with said head portion pointed toward said inlet end, said body portion being equipped with an explosive pack having an ignition means exposed to and facing said outlet end of the conduit body, said body portion further having an outside diameter larger than an inside diameter of the inlet end of the conduit body such that when said explosive pack is ignited by a flame entering said cavity of the conduit body from said outlet end, the bullet means severs from said mounting means and propels toward said inlet end such that the outside perimeter of said body portion of the bullet means frictionally engages said inside diameter of inlet end of said conduit body substantially blocking a passage in said inlet end and stopping propagation of said flame.

2. An apparatus for stopping the propagation of an ignited flammable gas according to claim 1 further comprising a sensor means mounted outside the inlet of said elongated conduit body for sensing a deployment of said bullet means and for sending a signal to a control panel.

3. An apparatus for stopping the propagation of an ignited flammable gas according to claim 2, wherein said sensor means is a magnetic sensing means for detecting the presence of said bullet means inside said inlet end of the conduit body when said bullet means is fabricated of metal.

4. An apparatus for stopping the propagation of an ignited flammable gas according to claim 1, wherein said bullet means is coated with a layer of anti-corrosion material on its outside surface.

5. An apparatus for stopping the propagation of an ignited flammable gas according to claim 1, wherein said bullet means is coated with a material comprises Teflon.

6. An apparatus for stopping the propagation of an ignited flammable gas according to claim 1, wherein said body portion of the bullet means having a tapered shape with a smaller end of the taper juxtaposed to said head portion of the bullet means, said smaller end of the taper having an outside diameter smaller than said inside diameter of said inlet end, and a larger end of the taper having an outside diameter larger than said inside diameter of said inlet end.

7. An apparatus for stopping the propagation of an ignited flammable gas according to claim 1, wherein said head portion of the bullet means being provided in a metal having magnetic characteristics.

8. An apparatus for stopping the propagation of an ignited flammable gas according to claim 1 further comprising conduit means for feeding an inert gas into a conduit having said flame produced therein for purging a flammable gas out of said conduit.

9. An apparatus for stopping the propagation of an ignited flammable gas according to claim 1, wherein said flame entering said cavity of the conduit body being produced by an ignited flammable gas.

10. An apparatus for stopping the propagation of an ignited flammable gas according to claim 1, wherein said apparatus being in fluid communication with a flammable gas supply source at said inlet end and with a chamber of a process machine at said outlet end.

11. A method for stopping the propagation of an ignited flammable gas in a conduit comprising the steps of:

providing an elongated conduit body having an inlet end and an outlet end, said conduit body having a mounting means fixedly attached to an inside wall of said elongated conduit body between said inlet end and said outlet end and a bullet means comprising a head portion and a body portion, detachably mounting said body portion of the bullet means to said mounting means with said head portion facing said inlet end of the conduit body, said body portion of the bullet means being equipped with an explosive pack having an ignition means exposed to and facing said outlet end of the conduit body, and igniting said explosive pack by a flame from an ignited flammable gas that enters into said outlet end of the conduit body and causing said head portion of the bullet means to be propelled toward said inlet end of the conduit body and resulting in a frictional engagement between an outside surface of the body portion of the bullet means and an inside surface of the inlet end of the conduit body to substantially block a passageway in said inlet end.

12. A method for stopping the propagation of ignited flammable gas in a conduit according to claim 11 further comprising the step of mounting a sensor means outside the inlet end of said conduit body for sensing the presence of said head portion of said bullet means when said bullet means has been deployed.

13. A method for stopping the propagation of ignited flammable gas in a conduit according to claim 12 further comprising the step of sending an alarm signal to a control panel when the presence of said head portion of the bullet means is sensed by said sensor means.

14. A method for stopping the propagation of ignited flammable gas in a conduit according to claim 11 further comprising the step of mounting a magnetic sensor means outside the inlet end of said conduit body.

15. A method for stopping the propagation of ignited flammable gas in a conduit according to claim 11 further comprising the step of coating an outside surface of the bullet means with a corrosion-proof cover layer.

16. A method for stopping the propagation of ignited flammable gas in a conduit according to claim 11 further comprising the step of coating an outside surface of the bullet means with a low frictional coefficient, corrosion-proof cover layer.

17. A method for stopping the propagation of ignited flammable gas in a conduit according to claim 11 further comprising the step of coating an outside surface of the bullet means with Teflon.

18. A method for stopping the propagation of ignited flammable gas in a conduit according to claim 11 further comprising the step of providing said body portion of the bullet means with a tapered shape having a smaller end of the taper connected to said head portion and a larger end of the taper frictionally engaging an inside surface of said inlet end of the conduit body.

19. A method for stopping the propagation of ignited flammable gas in a conduit according to claim 11 further comprising the step of fabricating said head portion of the bullet means in a magnetic metal.

20. A method for stopping the propagation of ignited flammable gas in a conduit according to claim 11 further comprising the step of feeding an inert gas into said conduit body after said bullet means is deployed.

* * * * *